Oct. 7, 1941.  R. E. MOORE  2,258,335
RELIEF VALVE
Filed Sept. 23, 1940
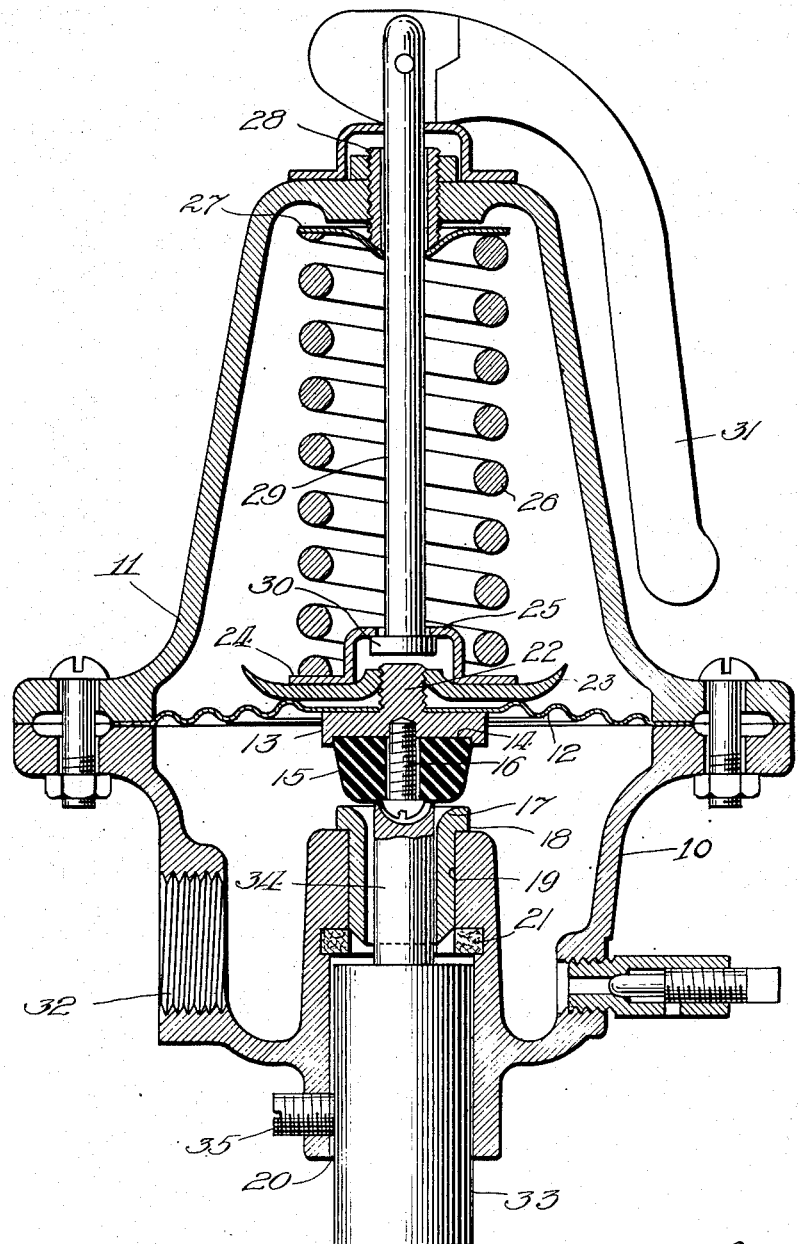
Inventor
Robert E. Moore
By Davis, Lindsey, Smith & Shonts
Attys Patented Oct. 7, 1941

2,258,335

UNITED STATES PATENT OFFICE 2,258,335

RELIEF VALVE

Robert E. Moore, Park Ridge, Ill.

Application September 23, 1940, Serial No. 357,845

2 Claims. (Cl. 137—53)

My invention relates to relief valves customarily employed with hot water heating systems to relieve excess pressures therein, and more particularly to an arrangement for insuring that the valve notwithstanding a long period of storage after assembly will be in safe, dependable working order when installed.

Valves of this type are usually spring loaded and the setting of the spring is adjusted at the factory, the loading commonly being of the order of thirty pounds per square inch. The spring maintains the valving element in contact with its seat and, since this element is usually made of rubber or other relatively soft material, it has been ascertained that a valve that has been stored for an indefinite period is prone to leakage when installed. This result may be due to the deformation of the valve element or the permanent set which it may acquire due to the one-way loading of the valve. After installation, this loading is partially counter-balanced by the pressure in the heating system so that the problem does not arise with a valve that is promptly used after assembly.

A further difficulty with this type of valve may arise due to the materials of which the valving element and its seat are made. Ordinarily the element is manufactured from rubber or some composition thereof, while the seat is composed of a non-ferrous metal. Where the loading on the element is materially unbalanced for a considerable period, as during storage, the element tends to stick firmly to the seat; hence when the valve is installed, there is serious danger that the valve will not relieve at the adjusted pressure, since to the resistance of the spring must be added the pressure necessary to break the adherence of the element to the seat.

It is therefore the principal object of my invention to devise a simple, cheap and conveniently attached member that may be incorporated in the valve after assembly and adjustment, and which maintains the integrity of the valving element regardless of the length of the storage period, so that the valve remains in prime condition for service.

This and further objects of my invention will be set forth in the following specification, reference being had to the accompanying drawing, and the novel means by which said objects are effectuated will be pointed out in the claims.

The figure is a sectional elevation of a typical relief valve conditioned in accordance with my invention.

Referring to the drawing, the numeral 10 designates an open-top housing which is closed by a cover 11 and between these parts is securely clamped a flexible, impervious diaphragm 12. Mounted on the underside of this diaphragm is a washer 13 having a recess 14 for receiving a valve 15 that may be secured in position by a screw 16 that is threaded in the washer 13. The valve 15 may be composed of rubber or a suitable rubber composition and it engages a valve seat 17 provided in a bushing 18 that is mounted in the upper end 19 of a drain passage whose lower end may be enlarged in diameter, as at 20, to receive the usual drain pipe. At the junction of the passages 19 and 20 is mounted a relatively soft rubber washer 21 for a purpose hereinafter explained.

The washer 13 is provided with a stem 22 that extends upwardly through the diaphragm 12 and is threaded into a plate 23, the central portion of the diaphragm being clamped between the washer 13 and the plate 23. A flange 24 is secured to the upper surface of the plate 23 and its central portion is offset therefrom to provide an annular shoulder 25. The lower end of a helical loading spring 26 bears against the flange 24 and the upper end against the under side of a disk 27 secured to the lower end of an adjusting screw 28 that is threaded through the top of the cover 11. A lifting rod 29 is centrally disposed within the spring 26 and its lower end is provided with a head 30 that engages the under side of the shoulder 25, the upper end of the rod extending through the top of the cover 11 for pivotal connection with a handle 31. This handle provides a manual means for lifting the valve 15 out of contact with the seat 17 against the loading of the spring 26 when the relief valve is mounted in the ordinary hot water heating system. When so connected it will be understood that the interior of the housing 10 below the diaphragm 12 is placed in communication with the water in the system by means of an appropriate pipe connection (not shown) that is threaded in the passage 32.

The valve above described has long been in use in hot water heating systems and its purpose is to provide an automatic relief for any excess pressure that may develop in the system. Ordinarily the spring 26 is set to relieve at a pressure of thirty pounds per square inch, and when this pressure is exceeded, the diaphragm 12 lifts the valve 15 free of contact with the seat 17.

As already noted, it is important in valves that may be stored for an indefinite period prior to installation in a system to provide some means for preventing the valve 15 from acquiring a permanent set or otherwise being deformed by the unbalanced pressure exerted by the spring 26 and also from sticking to the seat 17. This adherence is believed to be due to some element in the rubber composing the valve 15 which interacts in a disadvantageous manner with the non-ferrous metal composing the seat 17 which may be of brass, bronze or some comparable alloy. Moreover, any solution of the problem must necessarily be characterized by quick and easy installation, and a paramount requirement is that it must be cheap because of its temporary nature. For this purpose, I propose a simple cylindrical plug 33, which may be mounted within the passage 20 and which is provided with an extension 34 of reduced diameter that projects through the bushing 18 into contact with the central portion of the bottom surface of the valve 15, i. e. it contacts with a portion of the valve's under surface other than that annular portion which directly contacts the seat 17. This plug is moved upwardly in the passage 20 sufficient to displace the valve 15 from contact with its seat, as clearly indicated in the drawing, and the plug may be held in this position by a set screw 35. The valving element 15 is therefore maintained in dependable working condition until the valve is connected in a heating system.

My improved valve is further characterized by a safety factor in that the passage 20 possesses a smooth bore as contrasted with the usual threaded passage provided in valves of this type, and within which one end of the drain pipe is mounted.

Instances have been observed in the installation of these valves having threaded drain passages where the contractor or plumber has mistakenly inserted the drain pipe in the boiler connection opening 32, and has placed the pipe connecting the valve to the boiler in a threaded passage corresponding in position to the passage 20. Under these conditions, the valve will not relieve at the adjusted pressure because the boiler pressure is then operative only over the relatively small area provided on the under side of the valve 15. Accordingly, the valve will only relieve at a pressure considerably in excess of the adjusted pressure, so that the primary purpose of the relief valve is wholly lost when the valve is improperly connected in the manner stated.

In order to prevent any possible disruption of a system when the relief valve is so improperly installed, and to further provide a telltale that will indicate that something is wrong with the system, I propose that the usual threaded drain passage be replaced by the smooth bore passage 20 for receiving the drain pipe which can be held against the washer 21 by the set screw 35 with sufficient pressure to prevent any leakage when the valve is properly installed in a heating system. However, if the connection to the boiler should be made through the passage 20 then, notwithstanding that this boiler pipe may be held firmly against the washer 21, a boiler pressure of about five or six pounds will cause a leakage around the washer 21 due to the soft material of which it is composed. This leakage will then drain around the boiler pipe connection because this pipe would be sufficiently offset in the passage 20 by the set screw 35 to provide clearance between the pipe and the housing 10. It is contemplated that the telltale so provided will draw attention to the fact that the heating system needs inspection and correction of the difficulty indicated by the leakage.

I claim:

1. A relief valve for a hot water heating system having an opening constituting the inlet of the valve and adapted to receive a pipe for connecting the valve to the system, a spring loaded valving element which opens in response to a predetermined pressure in the valve inlet, a drain passage normally closed by the element for receiving one end of a drain pipe, the passage having a smooth bore whose diameter is slightly greater than that of the drain pipe and a soft gasket mounted in the passage and against which one end of the drain pipe is abutted, the gasket being conditioned to provide a leakage telltale at a pressure substantially below the setting of the spring loading in the event that the valve is improperly connected to the system by mounting the drain pipe in the valve inlet and the system connecting pipe in the drain passage.

2. In a relief valve for a hot water heating system comprising a valve casing part integrally provided with a smooth surface passage for receiving one end of a drain pipe when the valve is connected in a system, the end of the passage within the part being arranged as a valve seat, a valving element spring actuated to engage the seat and close the passage, means for opening the element at a predetermined pressure to relieve water through the pipe when the valve is connected in a system, and means for preventing the element from sticking to the seat and acquiring a permanent set or deformation prior to connection comprising a temporary, smooth surface plug mounted in the passage in abutting relation to and holding the element out of contact with the seat, and a common set screw for holding the plug in element displacing position prior to connection in a system and for holding the pipe in drain position when the valve is connected in a system.

ROBERT E. MOORE.